United States Patent [19]

Turner et al.

[11] 4,246,363
[45] Jan. 20, 1981

[54] REACTION INJECTION MOLDED POLYURETHANES HAVING PARTICULAR FLEXURAL MODULUS FACTORS AND AT LEAST TWO THERMAL TRANSITION TEMPERATURES IN A PARTICULAR RANGE

[75] Inventors: Robert B. Turner, Lake Jackson; Roy E. Morgan, Jr., Richwood, both of Tex.

[73] Assignee: The Dow Chemical Company, Midland, Mich.

[21] Appl. No.: 49,766

[22] Filed: Jun. 18, 1979

Related U.S. Application Data

[63] Continuation-in-part of Ser. No. 922,148, Jul. 5, 1978, abandoned.

[51] Int. Cl.³ ............................................. C08G 18/14
[52] U.S. Cl. .................................. 521/163; 252/182; 521/174; 528/77; 528/78; 528/79
[58] Field of Search ............... 252/182; 521/163, 174; 528/77, 78, 79

[56] References Cited

U.S. PATENT DOCUMENTS

| | | | |
|---|---|---|---|
| 3,558,529 | 1/1971 | Whitman et al. | 521/174 |
| 3,684,770 | 8/1972 | Meisert et al. | 8/115.6 |
| 3,983,068 | 9/1976 | Olstowski | 260/33.2 R |
| 4,028,303 | 6/1977 | Olstowski | 260/33.2 R |
| 4,048,105 | 9/1977 | Salisbury | 521/174 |
| 4,049,636 | 9/1977 | Mao et al. | 528/75 |
| 4,102,833 | 7/1978 | Salisbury | 521/159 |
| 4,107,106 | 8/1978 | Dunleavy et al. | 521/164 |

OTHER PUBLICATIONS

Ludwico et al., "The Bayflex 110 Series", Society of Automotive Engineers Passenger Car Meeting, Detroit, Sep. 26-30, 1977.
Gerkin et al., "The Properties of High Modulus RIM Urethanes", Society of Automotive Engineers Passenger Car Meeting, Detroit, Sep. 26-30, 1977.
Rowton, *J. Elastomers and Plastics*, Oct. 9, 1977, pp. 365-375.
Bonart, *J. Macromol. Sci.-Phys.*, B2(1), Mar., 1968, pp. 115-138.
Wilkes et al., *J. Macromol. Sci.-Phys.*, B7(1), 1973, pp. 157-175.
Wischmann et al., *J. of Elastomers & Plastics*, Jul. 9, 1977, pp. 299-311.

*Primary Examiner*—Maurice J. Welsh
*Attorney, Agent, or Firm*—J. G. Carter

[57] ABSTRACT

Polyurethane reaction injection molded products are prepared which have flexural modulus factors ($-20°$ F./158° F.) below 3.4 and often below 2. They are prepared by employing three different polyols or mixtures of polyols, each polyol having a specified reactivity relationship and are employed within specified solubility parameter relationships. These products also have at least two thermal transition temperatures.

39 Claims, No Drawings

REACTION INJECTION MOLDED POLYURETHANES HAVING PARTICULAR FLEXURAL MODULUS FACTORS AND AT LEAST TWO THERMAL TRANSITION TEMPERATURES IN A PARTICULAR RANGE

CROSSREFERENCE TO RELATED APPLICATIONS

This application is a continuation-in-part of our copending application Ser. No. 922,148 filed July 5, 1978 now abandoned.

BACKGROUND OF THE INVENTION

The present invention concerns polyurethanes for reaction injection molding (RIM) applications. Such polyurethanes are being sought for use in various automobile parts so as to reduce weight. As the physical properties are improved, the applications available for replacement of automobile parts currently made of metal can be increased. Such polyurethane RIM applications are thoroughly discussed in a paper by R. M. Gerkin and F. E. Critchfield, titled "THE PROPERTIES OF HIGH MODULUS RIM URETHANES", presented at the September 26–30, 1977 meeting of the Society of Automotive Engineers and in a paper by W. W. Ludwico and R. P. Taylor titled "THE BAYFLEX 110 SERIES-THE NEW GENERATION OF RIM MATERIALS" presented at the same meeting.

One such property which is desirable is to decrease the difference in flexural modulus values as measured at high and low temperatures. The Gerkin and Critchfield article revealed a ratio of the flexural modulus value measured at $-23°$ C. divided by the value measured at $70°$ C. for unfilled formulations of 5.75 (230÷40), 5.45 (316÷58) and 6.83 (205÷30) see pages 3 and 5. The Ludwico and Taylor paper disclosed ratios of flexural modulus values on unfilled systems measured at $-30°$ C. and $65°$ C. of 3.56 (64÷18) see Table I.

We have now discovered polyurethanes useful in RIM applications which have ratios of the flexural modulus values measured on unfilled systems at $-20°$ F. and $158°$ F. of less than about 3, preferably less than about 2 and such polyurethanes also have at least 2 and preferably at least 3 thermal transition temperatures as measured by thermomechanical analysis between $-100°$ C. and the decomposition temperature of the polyurethane.

SUMMARY OF THE INVENTION

The present invention concerns polyurethanes having a flexural modulus factor ($-20°$ F./$158°$ F.) of <3.4, preferably <3.0, most preferably <2.75 and even <2.0 and at least two, preferably at least three thermal transition temperatures between $-100°$ C. and the decomposition temperature of the polyurethane as determined by thermomechanical analysis.

The present invention also pertains to a polyurethane composition having a flexural modulus factor ($-20°$ F./$158°$ F.) of <3.4, preferably <3.0, most preferably <2.75 and even less than about 2.0 and at least two, preferably at least three thermal transition temperatures between $-100°$ C. and the decomposition temperature of the polyurethane as determined by thermomechanical analysis, said composition resulting from admixing and reacting the components of a composition comprising:

(A) a first polyol or mixture of polyols having a plurality of hydrogen atoms reactive with an NCO and/or an NCS group, an average active hydrogen equivalent weight of from about 50 to about 4000, preferably from about 70 to about 3000, most preferably from about 85 to about 2500 and an average active hydrogen functionality of from about 2 to about 8, preferably from about 2 to about 4, (B) a second polyol or mixture of polyols having a plurality of hydrogen atoms reactive with an NCO and/or an NCS group, an average active hydrogen equivalent weight of from about 50 to about 4000, preferably from about 65 to about 1000, most preferably from about 65 to about 500 and an active hydrogen functionality of from about 2 to about 8, preferably from about 3 to about 4, (C) a third polyol or mixture of polyols having a plurality of hydrogen atoms reactive with an NCO and/or an NCS group, an active hydrogen equivalent weight of from about 20 to about 4000, preferably from about 30 to about 120, most preferably from about 50 to about 100 and an average active hydrogen functionality of from about 2 to about 6 preferably from about 2 to about 4, most preferably from about 2 to about 3, and (D) an organic compound having a plurality of NCO and/or NCS groups or mixture of such compounds; wherein (1) at least two, preferably three, of the polyol components (A), (B) and (C) have different relative reactivities, at the temperature of reaction, with component (D) and the relative reactivity of polyol component (B) is equal to or greater than that of polyol components (A) and (C);

(2) the solubility parameter of each of the polyols in polyol components (A), (B) and (C) is different from each other by a value greater than 0.49 when the number of active hydrogen equivalents contributed by polyol component (C) is greater than the number of active hydrogen equivalents contributed by polyol component (B);

(3) the NCO and/or NCS:active hydrogen equivalent ratio is from about 0.75:1 to about 1.5:1, suitably from about 0.75:1 to about 1.25:1, preferably from about 0.95:1 to about 1.25:1, most preferably from about 1.01:1 to about 1.10:1.

The present invention also concerns a polyol mixture suitable for reacting with an organic compound containing a plurality of NCO and/or NCS groups or mixture of such compounds so as to form a polyurethane having at least two, preferably at least three thermal transition temperatures between $-100°$ C. and the decomposition temperature of the polyurethane as determined by thermomechanical analysis and a flexural modulus factor ($-20°$ F./$158°$ F.) of <3.4, <3.0, most preferably <2.75 and even <2.0, said polyol mixture comprising:

(A) a first polyol or mixture of polyols having a plurality of hydrogen atoms reactive with an NCO and/or an NCS group, an average active hydrogen equivalent weight of from about 50 to about 4000, preferably from about 70 to about 3000, most preferably from about 85 to about 2500 and an average active hydrogen functionality of from about 2 to about 8, preferably from about 2 to about 4, (B) a second polyol or mixture of polyols having a plurality of hydrogen atoms reactive with an NCO and/or an NCS group, an average active hydrogen equivalent weight of from about 50 to about 4000, preferably from about 65 to about 1000, and most preferably from about 65 to about 500 and an active hydrogen functionality of from about 2 to about 8, preferably from about 3 to about 4, (C) a third polyol or mixture of polyols having a plurality of hydrogen atoms reactive with an NCO and/or an NCS group, an active hydrogen equivalent weight of from about 20 to about 4000, preferably from about 30 to about 120, most preferably from about 50 to about 100 and an average active hydrogen functionality of from about 2 to about 6 preferably from about 2 to about 4, most preferably from about 2 to about 3, and wherein (1) at least two, preferably three, of the polyol components (A), (B) and (C) have different relative reactivities, at the temperature of reaction, with said compound having a plurality of NCO and/or NCS groups and the relative reactivity of polyol component (B) is equal to or greater than that of components (A) and (C); and (2) the solubility parameter of each of the polyols in polyol components (A), (B) and (C) is different from each other by a value greater than 0.49 when the number of active hydrogen equivalents contributed by polyol component (C) is greater than the number of active hydrogen equivalents contributed by polyol component (B).

The present invention further concerns a process for the preparation of a polyurethane having a flexural modulus factor ($-20°$ F./$158°$ F.) of <3.0, most preferably less than 2.75 and over less than 2.0 and at least two, preferably at least 3 thermal transition temperatures between $-100°$ C. and the decomposition temperature of the polyurethane as determined by thermomechanical analysis, which process comprises admixing and reacting the components of a composition comprising:

(A) a first polyol or mixture of polyols having a plurality of hydrogen atoms reactive with an NCO and/or an NCS group, an average active hydrogen equivalent weight of from about 50 to about 4000, preferably from about 70 to about 3000, most preferably from about 85 to about 2500 and an average active hydrogen functionality of from about 2 to about 8, preferably from about 2 to about 4, (B) a second polyol or mixture of polyols having a plurality of hydrogen atoms reactive with an NCO and/or an NCS group, an average active hydrogen equivalent weight of from about 50 to about 4000, preferably from about 65 to about 1000, most preferably from about 65 to about 500 and an active hydrogen functionality of from about 2 to about 8, preferably from about 3 to about 4, (C) a third polyol or mixture of polyols having a plurality of hydrogen atoms reactive with an NCO and/or an NCS group, an active hydrogen equivalent weight of from about 20 to about 4000, preferably from about 30 to about 120, most preferably from about 50 to about 100 and an average active hydrogen functionality of from about 2 to about 6 preferably from about 2 to about 4, most preferably from about 2 to about 3, and (D) an organic compound having a plurality of NCO and/or NCS groups or mixture of such compounds; wherein (1) at least two, preferably three, of the polyol components (A), (B) and (C) have different relative reactivities, at the temperature of reaction, with component (D) and the relative reactivity of polyol component (B) is equal to or greater than that of polyol components (A) and (C);

(2) the solubility parameter of each of the polyols in polyol components (A), (B) and (C) is different from each other by a value greater than 0.49 when the number of active hydrogen equivalents contributed by polyol component (C) is greater than the number of active hydrogen equivalents contributed by polyol component (B); and (3) the NCO and/or NCS:active hydrogen equivalent ratio is from about 0.75:1 to about 1.5:1, suitably from about 0.75:1 to about 1.25:1, preferably from about 0.95:1 to about 1.25:1, most preferably from about 1.01:1 to about 1.10:1.

DESCRIPTION OF THE PREFERRED EMBODIMENTS

The term "polyurethane" as employed herein means the polymeric reaction product of an active hydrogen containing compound with an NCO and/or NCS containing compound. The product may also contain other reaction products such as an NCO or NCS group being reacted with another NCO or NCS group. The reaction products nevertheless contain a plurality of one or more of the following groups:

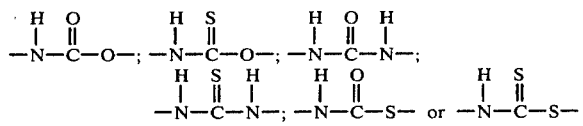

The term "thermal transition temperature" as employed herein is defined as a change in linear coefficient of thermal expansion as defined in *MACROMOLECULES 1 STRUCTURE AND PROPERTIES*, by Haus-Georg Elias, Plenum Press, 1977, Chapter 10.

The term "flexural modulus factor" as employed herein is defined as the flexural modulus value obtained at one temperature divided by the flexural modulus value obtained at a higher temperature, the particular temperatures being indicated in parenthesis following the term e.g. ($-20°$ F./$158°$ F.) means that the factor was obtained by dividing the flexural modulus value obtained at $-20°$ F. by that value obtained at $158°$ F.

The term "polyol" as employed herein means a substance which has active hydrogen atoms which are reactive with NCO or NCS groups such as, for example, —OH, —SH,

—NH$_2$, combinations thereof, i.e two or more different groups on a single molecule, and the like.

The term "organic compound having a plurality of NCO and/or NCS groups" as employed herein means that said compound contains at least two groups selected from NCO and/or NCS.

The "solubility parameters" of the various materials can be determined by the equation $$\delta^2 = \frac{\Delta H_v - RT}{V_m}$$

where

δ is the solubility parameter,

ΔH is the latent heat of vaporization expressed as calories per mole at 25° C.,

R is the gas constant $$(1.987 \frac{calories}{°K. \times mole})$$

T is the temperature in °K. and $V_m$ is the molar volume in cubic centimeters.

The solubility parameters of various polymers are discussed by P. A. Small in "SOME FACTORS AFFECTING THE SOLUBILITY OF POLYMERS", *J. Appl. Chem.*, Vol. 3, Feb. 1953, pp. 71–80; by Haus-Georg Elias in *MACROMOLECULES* 1 STRUCTURE AND PROPERTIES, Plenum Press, 1977, Chapter 6; and by R. F. Fedors in "A METHOD FOR ESTIMATING BOTH SOLUBILITY PARAMETERS AND MOLAR VOLUMES OF LIQUIDS", *Polymer Engineering and Science*, February 1974, Vol. 19, No. 2, pp 147–154.

Suitable polyols which can be employed in the present invention include, for example, polyether polyols, polyester polyols, phosphoric acid initiated polyols and amine initiated polyols, polythioethers, polyacetals, polycarbonates, polyester amides, mixtures thereof and the like.

Suitable initiators which may be employed to prepare the polyether polyols include those compounds having 2 to 8 active hydrogen atoms such as, for example, water, ethylene glycol, propylene glycol, butane diol, hexane diol, glycerine, trimethylol propane, pentaerythritol, hexane triol, sorbitol, sucrose, hydroquinone, resorcinol, catechol, bisphenols, novolac resins, mixtures thereof and the like.

Suitable amine initiators which can be employed as a polyol or to prepare an amine initiated polyol include, for example, ammonia, ethylenediamine, 1,3-diaminopropane, 1,4-diaminobutane, 1,5-diaminopentane, 1,6-diaminohexane, diethylenetriamine, triethylenetetramine, tetraethylenepentamine, pentaethylenehexamine, ethanolamine, aminoethylethanolamine, aniline, 2,4-toluenediamine, 2,6-toluenediamine, diaminodiphenyloxide (oxydianiline), 2,4'-diamino-diphenylmethane, 4,4'-diaminodiphenylmethane, 1,3-phenylenediamine, 1,4-phenylenediamine, naphthylene-1,5-diamine, triphenylmethane-4,4',4''-triamine, 4,4'-di(methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane and amine aldehyde condensation products such as the polyphenyl-polymethylene polyamines produced from aniline and formaldehyde, mixtures thereof and the like.

Suitable initiators or polyols also include thiols such as, for example, ethanedithiol, propanedithiol, butanedithiol, pentanedithiol; hexanedithiol, propanetrithiol, hexanetrithiol, mixtures thereof and the like.

Suitable alkylene oxides or vicinal epoxy compounds which may be reacted with the hydroxyl- or thio-containing, amine-containing compounds or phosphoric acid include, for example, ethylene oxide, 1,2-propylene oxide, 1,2-butylene oxide, 2,3-butylene oxide, styrene oxide, epichlorohydrin, epibromohydrin, epiiodohydrin, mixtures thereof and the like.

Suitable polyester polyols which may be employed herein include, for example, those prepared by reacting a polycarboxylic acid or anhydride thereof with a polyhydric alcohol. The polycarboxylic acids may be aliphatic, cycloaliphatic, aromatic and/or heterocyclic and may be substituted (e.g. with halogen atom) and/or unsaturated. Examples of carboxylic acids of this kind include succinic acid; adipic acid; suberic acid; azelaic acid; sebacic acid; phthalic acid, isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids; such as oleic acid, which may be in admixture with monomeric fatty acids, terephthalic acid dimethyl ester; terephthalic acid bisglycol ester and the like. Mixtures of such acids or anhydrides may also be employed.

Examples of suitable polyhydric alcohols include ethylene glycol, 1,2-propylene glycol; 1,3-propylene glycol; 1,4-, 1,2- and 2,3-butylene glycol; 1,6-hexane diol; 1,8-octane diol; neopentyl glycol; cyclohexane dimethanol (1,4-bis-hydroxymethyl cyclohexane) 2-methyl-1,3-propane diol; glycerol; trimethylol propane; 1,2,6-hexane triol; 1,2,4-butane triol; trimethylol ethane; pentaerythritol; quinitol; mannitol; sorbitol; methyl glycoside; diethylene glycol; triethylene glycol; tetraethylene glycol; polyethylene glycol; dipropylene glycol; polypropylene glycols; dibutylene glycol; polybutylene glycols and the like. The polyesters may contain some terminal carboxyl groups. It is also possible to use polyesters of lactones such as caprolactone, or hydroxy carboxylic acids such as hydroxy caproic acid.

Suitable polythioethers which can be employed include, for example, the condensation products of thiodiglycol alone or thiodiglycol with other glycols, dicarboxylic acids, formaldehyde, amino carboxylic acids or amino alcohols. The products can be characterized as polythio mixed ethers, polythioether esters or polythioether ester amides, depending upon the co-components used.

Examples of suitable polyacetals include the compounds obtained from formaldehyde and glycols, such as diethylene glycol, triethylene glycol, 1,1'-isopropylidenebis-(p-phenyleneoxy)di-ethanol-2, hexane diol, and the like. Polyacetals suitable for use in accordance with the invention can also be obtained by polymerizing cyclic acetals.

Suitable polycarbonates containing hydroxyl groups are those of the type which are generally known and which may be obtained by reacting diols, such as 1,3-propane diol, 1,4-butane diol, 1,6-hexane diol, diethylene glycol, triethylene glycol or tetraethylene glycol, with diaryl carbonates, for example diphenyl carbonate, or phosgene.

The polyester amides and polyamides suitable for use herein include the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds already containing urethane or urea groups and modified natural polyols, such as castor oil, carbohydrates or starch, may also be used. Addition products of alkylene oxides with phenol-formaldehyde resins or even with urea-formaldehyde resins may also be used in accordance with the invention.

Examples of the many and varied types of compounds suitable for use in accordance with the invention are described, for example, in HIGH POLYMERS, VOL. XVI, "POLYURETHANES, CHEMISTRY AND TECHNOLOGY", by Sanders-Frisch, Interscience Publishers, New York, London, Vol. I, 1962, pages 32 to 42 and pages 44 to 54, and Vol. II, 1964, pages 5 to 6 and 198 to 199.

Other polyols which can be employed herein, include, polymer-containing polyols such as, for example, those disclosed in U.S. Pat. Nos. Re. 29,118, Re. 28, 715, Re 29,014, and 3,869,413.

Also suitable as polyols include aminated polyglycols such as those described in U.S. Pat. Nos. 3,236,895; 3,666,788; 3,838,076; 3,847,992 and 4,070,530.

Suitable organic aromatic polyisocyanates which can be employed herein include, for example, any such polyisocyanate having 2 or more NCO groups per molecule such as, for example, 2,4-toluenediisocyanate, 2,6-toluenediisocyanate, p,p'-diphenylmethanediisocyanate, p-phenylenediisocyanate, naphthalenediisocyanate, polymethylene polyphenylisocyanates, mixtures thereof and the like.

Also suitable are organic aromatic polyisocyanates and the prepolymers prepared from such polyisocyanates and compounds having 2 or more active hydrogen atoms.

Suitable organic aliphatic polyisocyanates include, in addition to the hydrogenated derivatives of the above mentioned organic aromatic polyisocyanates, 1,6-hexamethylene diisocyanate, 1,4-cyclohexyl diisocyanate, 1,4-bis-isocyanatomethyl-cyclohexane, mixtures thereof and the like.

Also suitable are the corresponding polyisothiocyanates.

The polyurethanes can be prepared either in the presence or absence of a catalyst. Those polyurethanes prepared from amine containing polyols do not usually require a catalyst although catalysts can be employed if desired. On the other hand, those polyurethanes prepared from polyols which do not contain nitrogen atoms are preferably prepared in the presence of a catalyst.

Suitable catalysts which may be employed herein include, for example, organo-metal compounds, tertiary amines, alkali metal alkoxides, mixtures thereof and the like.

Suitable organo-metal catalysts include, for example, organo-metal compounds of tin, zinc, lead, mercury, cadmium, bismuth, antimony, iron, manganese, cobalt, copper, vanadium an the like such as, for example, metal salts of a carboxylic acid having from about 2 to about 20 carbon atoms including, for example, stannous octoate, dibutyltin dilaurate, dibutyltin diacetate, ferric acetyl acetonate, lead octoate, lead oleate, phenylmercuric propionate, lead naphthenate, manganese naphthenate, copper naphthenate, vanadryl naphthenate, cobalt octoate, cobalt acetate, copper oleate, vanadium pentoxide, mixtures thereof and the like.

Suitable amine catalysts include, for example, triethylenediamine, triethylamine, tetramethylbutanediamine, N,N-dimethylethanolamine, N-ethylmorpholine, bis (2-dimethylaminoethyl)ether, N-methylmorpholine, N-ethylpiperidine, 1,3-bis-(dimethylamino)-2-propanol, N,N,N',N'-tetramethylethylenediamine, mixtures thereof and the like.

Suitable alkali metal alkoxides which can be employed as catalysts for urethane formation include, for example, sodium ethoxide, potassium ethoxide, sodium propoxide, potassium propoxide, sodium butoxide, potassium butoxide, lithium ethoxide, lithium propoxide, lithium butoxide, alkali metal salts of polyols such as described in U.S. Pat. No. 3,728,308, mixtures thereof and the like.

Preferably, these urethane catalysts are in liquid form, but if they are inherently a solid at the application temperature, then they may be dissolved in an appropriate liquid, such as, for example, dipropylene glycol.

The catalysts, when employed, can be employed in quantities of from about 0.001 to about 5, preferably from about 0.01 to about 1 part per 100 parts of total polyol employed depending upon the activity of the catalyst. Very weak catalysts could possibly be employed in quantities above 5 parts per 100 parts of polyol.

If desired, the densities of the polyurethanes produced herein can be reduced by incorporating a blowing agent into the formulation. Suitable such blowing agents are fully described in U.S. Pat. No. 4,125,487 and in U.S. Pat. No. 3,753,933 and so much of this application and patents as pertains to blowing agents is incorporated herein by reference. Particularly suitable blowing agents include the low boiling halogenated hydrocarbons such as methylene chloride and trichloromonofluoromethane.

Another suitable method for reducing the density is by frothing by injecting an inert gas into the mixture of urethane forming components. Suitable such inert gases include, for example, nitrogen, oxygen, carbon dioxide, xenon, helium, mixtures thereof such as air and the like.

If desired, cell control agents can be employed, particularly when preparing foams or products of reduced density and/or to assist in paintability of the polyurethane. Suitable cell control agents which can be employed herein include silicone oils such as, for example, DC-193, DC-197 and DC-198 commercially available from Dow Corning Corp.; SF-1034, PFA-1635, PFA-1700 and PFA-1660 commercially available from General Electric Co.; and L-520 and L-5320 commercially available from Union Carbide Corp., mixtures thereof and the like.

The polyurethanes of the present invention may additionally contain, if desired, coloring agents, mold release agents, fire retardant agents, fillers, modifiers and the like.

Suitable liquid and solid modifiers are disclosed and described in U.S. Pat. No. 3,773,697 and so much thereof as pertains to suitable modifier substances are incorporated herein by reference. However, any such modifier described therein which fulfills the definition of either of the polyol components (A), (B) and (C) as described in this application are not considered as modifiers but rather as one of the polyol components.

Particularly suitable as the modifier or filler substances are fiberglass reinforcement fibers, particularly those having lengths of from about 1/16 inch (0.16 cm) to about ½ inch (1.27 cm). Another particularly suitable filler is mica.

The components which react to form the polyurethanes of the present invention can be shaped or formed into useful articles by pouring or injecting the reactive mixture into molds which are capable of withstanding the exotherm of the polymerizing mass and are non-reactive with and are insoluble when in contact with the liquid reactive mixture. Particularly suitable molds are those made of metal such as aluminum, copper, brass, steel and the like. In some instances non-metal molds can be employed such as those made of, for example, polyethylene, polypropylene, polyethylene terephthalate, silicone elastomers and the like.

To prevent the solidifying mass from adhering to the mold surface, it may be necessary to precoat the mold surface with a film of a sutable mold release agent such as, for example, hydrocarbon wax or a polysiloxane preparation or a polytetrafluoroethylene coating, or employ an internal mold release agent in the composition.

When pouring a relatively rapid-setting blend into massive metal molds, it may be necessary for rapid demolding to preheat the molds to an appropriate temperature so that the mold will not abstract the heat of polymerization from the reactive mass and inappropriately delay the solidification time expected of a given formulation. On the other hand, thin wall metal molds could exhibit a minimal "heat sink" effect on relatively large cross section castings and thus, these thin wall metal molds may not require preheating.

The following examples are illustrative of the present invention and are not to be construed as to limiting the scope thereof in any manner.

Following is a list of materials employed in the examples and comparative experiments.

*Polyol A* is the reaction product of glycerine and propylene oxide at a molar ratio of about 1 to 6 respectively and having an equivalent weight of about 150.

*Polyol B* is the reaction product of Polyol A with a mixture of 92% propylene oxide and 8% by weight of ethylene oxide having the properties given in Table I.

*Polyol C* is the reaction product of Polyol A with propylene oxide and subsequently end-capped with ethylene oxide. The ethylene oxide content is approximately 10% by weight of the total amount of oxide added. The properties are given in Table I.

*Polyol D* is the reaction product of Polyol A with propylene oxide and subsequently end-capped with ethylene oxide. The amount of ethylene oxide is about 17% by weight of the total amount of oxide added. The properties are given in Table I.

*Polyol E* is the reaction product of aminoethylethanol amine with propylene oxide at a molar ratio of 1 to 3 respectively. The properties are given in Table I.

*Polyol F* is the reaction product of glycerine with propylene oxide at a molar ratio of 1 to three respectively. The properties are given in Table I.

*Polyol G* is a polyoxypropylene glycol. The properties are given in Table I.

*Polyol H* is diethanol amine. The properties are given in Table I.

*Polyol I* is diethylenetriamine. The properties are given in Table I.

*Polyol J* is propylene glycol. The properties are given in Table I.

*Polyol K* is dipropylene glycol. The properties are given in Table I.

*Polyol L* is diethylene glycol. The properties are given in Table I.

*Polyol M* is triethylene glycol. The properties are given in Table I.

*Polyol N* is tetraethylene glycol. The properties are given in Table I.

*Polyol O* is a polyoxypropylene glycol end-capped with $NH_2$ groups. This polyol is commercially available from Jefferson Chemical Co. as D-2000. The properties are given in Table I.

*Polyol P* is the reaction product of sucrose with propylene oxide at a molar ratio of 1 to 16 respectively. The properties are given in Table I.

*Polyol Q* is the reaction product of bisphenol A with ethylene oxide. The properties are given in Table I.

*Polyol R* is the reaction product of glycerine with propylene oxide subsequently end-capped with about 17 wt % ethylene oxide. The properties are given in Table I.

*Polyol S* is a blend of 95 wt % Polyol R with 5 wt % of a copolymer polyol prepared by insitu polymerizing 80 wt % acrylonitrile and 20% styrene in the reaction product of Polyol R and allyl chloride in a molar ratio of 1 to ½ respectively. The copolymer solids level was 30% by weight. The properties are given in Table I.

*Polyol T* is the same as Polyol S except that 50 wt % acrylonitrile and 50 wt % styrene was employed at a solids level of 21%. The properties are given in Table I.

*Polyol U* is the reaction product of Polyol A end-capped with about 28 wt % ethylene oxide. The properties are given in Table I.

*Polyol V* is the reaction product of glycerine and ethylene oxide to a molecular weight of about 336.

*Polyisocyanate A* is a mixture of 2,4-/2,6-toluene diisocyanate at a respective ratio of 80%/20% by weight. The properties are given in Table I.

*Polyisocyanate B* is a prepolymer prepared by reacting Polyisocyanate A with Polyol F at a molar ratio of 6.7 to 1 respectively. The prepolymer contains about 30.1% NCO groups by weight. The properties are given in Table I.

*Polyisocyanate C* is a polymethylene polyphenylisocyanate having an average functionality of about 2.7 commercially available from The Upjohn Company as PAPI 135. The properties are given in Table I.

*Polyisocyanate D* is modified diphenylmethane diisocyanate containing a high percentage of pure diphenylmethane diisocyanate and a lesser amount of polycarbodiimide adducts commercially available from The Upjohn Company as ISONATE 143L. The properties are given in Table I.

*Polyisocyanate E* is isophorone diisocyanate, an aliphatic isocyanate. The properties are given in Table I.

*Polyisocyanate F* is a modified diphenyl methane diisocyanate containing 30% NCO by weight commercially available from The Upjohn Company as Isocyanate 191. The properties are given in Table I.

*Polyisocyanate G* is a liquid aliphatic diisocyanate believed to be 4,4'-diisocyanatodicyclohexyl methane containing about 31.8% NCO by weight and commercially available from E. I. duPont deNemours and Company as HYLENE ® W. The properties are given in Table I.

*Filler A* is 1/16" milled glass fibers commercially available from Owens Corning Fiberglass Corporation as P117B-1/16" milled glass fibers.

*Filler B* is ¼" milled glass fibers commercially available from Owens Corning Fiberlgass Corporation as P117B-¼" milled glass fibers.

*Filler C* is mica commercially available from Marietta Resources International as Suzorite 200 S.

*Filler D* is 1/16" milled glass fibers commercially available from Owens Corning Fiberglass Corporation as 731CB-1/16" milled glass fibers.

*Modifier A* is a non-reactive, halogen containing organic phosphate ester commercially available from Monsanto Company as PHOSGARD C-22-R.

*Catalyst A* is an organo-tin sulfide commercially available from Witco Chemical Corp. as FOMREZ UL-6.

*Catalyst B* is commercially available from Witco Chemical Corp. as FOMREZ UL-28.

*Catalyst C* is a mixture of 80% dimethyl ethanolamine and 20% triethylenediamine commercially available from Air Products and Chemicals, Inc. as DABCO R-8020.

*Catalyst D* is stannous octoate commercially available from M&T Chemicals, Inc. as T-9.

*Catalyst E* is dibutyltin dilaurate commercially available from M&T Chemicals, Inc. as T-12.

*Catalyst F* is 33% triethylenediamine in dipropylene glycol commercially available from Air Products and Chemicals, Inc. as DABCO 33LV.

TABLE I

| Material | molecular Weight | Equiv. Weight | Solubility Parameter[3] | Solubility Parameter[4] |
|---|---|---|---|---|
| Polyol B | 3000 | 1000 | 9.0 | 9.4 |
| Polyol C | 3000 | 1000 | 9.9 | 8.9 |
| Polyol D | 7285 | 2428 | 8.9 | 8.9 |
| Polyol E | 276 | 69 | 12.3 | 14.6 |
| Polyol F | 258 | 86 | 8.9 | 9.2 |
| Polyol G | 2000 | 1000 | 7.8 | 8.9 |
| Polyol H | 105 | 35 | 10.62 | 11.5 |
| Polyol I | 103 | 20.6 | 11.54 | 10.9 |
| Polyol J | 76 | 38 | 14.99 | 14.7 |
| Polyol K | 134 | 67 | 11.53 | 11.7 |
| Polyol L | 106 | 53 | 14.24 | 14.9 |
| Polyol M | 150 | 75 | 12.81 | 13.6 |
| Polyol N | 194 | 97 | 11.81 | 12.8 |
| Polyol O | 2000 | 500[5] | 8.25 | 8.6 |
| Polyol P | 1272 | 159 | N.D.[1] | N.D. |
| Polyol Q | 404 | 202 | 8.39 | N.D. |
| Polyol R | 5100 | 1700 | 7.9 | N.D. |
| Polyol S | 7287 | 2429 | 7.9[2] | N.D. |
| Polyol T | 7500 | 2500 | 7.9[2] | N.D. |
| Polyol U | 8947.4 | 2982.5 | 8.5 | N.D. |
| Polyol V | 336 | 112 | 9.4 | N.D. |
| Polyisocyanate A | — | 87 | 19.9 | N.D. |
| Polyisocyanate B | — | 141 | 10.9 | N.D. |
| Polyisocyanate C | — | 135 | 15.8 | N.D. |
| Polyisocyanate D | — | 144 | 15.08 | N.D. |
| Polyisocyanate E | — | 111.1 | N.D. | N.D. |
| Polyisocyanate F | — | 140.6 | 15.2 | N.D. |
| Polyisocyanate G | — | 132 | N.D. | N.D. |

[1]N.D. = Insufficient data available to calculate.
[2]The values are calculated on the basis of Polyol R only.
[3]Calculated by the method of Small as referenced on page 10.
[4]Calculated by the method of Fedors as referenced on page 10.
[5]Based on total no. of active hydrogens (4). The manufacturer reports the equivalent weight to be 1000 by considering only the more reactive primary amine hydrogens (2).

EXAMPLE I—METHOD FOR DETERMINING RELATIVE REACTIVITIES FOR POLYOLS

A. Gel Time

The relative reactivity of a particular polyol can be determined by blending small portions of the polyol and a polyisocyanate in the presence or absence of a catalyst and measuring the time from mixing until a gel is formed. For illustrative purposes, the relative reactivities for several polyols were determined by mixing the polyol in a quantity so as to provide an NCO:OH ratio of 1:1 with 67.5 grams of Polyisocyanate C in the presence of 0.25 cc of Catalyst D. The polyol, quantity of polyol and the gel time are given in the following Table II. The shorter the gel time the greater the reactivity.

B. Fourier Transform Method

The rate of reactivity of the various polyols with isocyanate was also determined using a Fourier transform infrared spectrophtometer by following the disappearance of the isocyanate and/or the appearance of the carbonyl band as a function of time. At a polyol to isocyanate ratio of 10 to 1 equivalents of OH to NCO 16 interferograms were obtained for each spectrum at a resolution of 8 cm$^{-1}$ following mixing the glycol, catalyst (T-9) and then adding the isocyanate. The time was measured from the addition of the isocyanate. Upon completion of the mixing the mixture was filmed between two KBr plates (the plates being warmed before filming in the 100° F. studies). The absorbance of the isocyanate band (2270 cm$^{-1}$) was divided by the absorbance of an appropriate glycol band (a band substantially free of interference from bands belonging to the reaction products) and these ratios plotted versus the concentration of isocyanate in grams for 100 milliliters of solution. This technique was satisfactory for the intermediate and slow reactive polyols, but the faster reacting amine initiated polyols were indirectly standardized with propylene carbonate and these data plotted. Several of the slow and intermediate polyols were also indirectly standardized using propylene carbonate and the data obtained were in close agreement with the direct method. Since the amount of catalyst also effects the reaction, studies were undertaken to relate to the reaction rates of polyols at different catalyst levels and therefrom a correction factor was obtainable which could be applied to calculate relative reactivities. The correction factors were 0.04 for slow polyols, 1 for intermediate polyols and 8.7 for the fast polyols, using 2.5 to 3 grams of T-9 catalyst per mole OH, 0.25 grams T-9 per mole OH and 0.015 grams T-9 per mole OH, for the slow, intermediate and fast polyols respectively. The polyisocyanate employed was a polymethylene polyphenylisocyanate having an average functionality of about 2.3 and an NCO equivalent weight of about 133, commercially available from The Upjohn Co. as PAPI 901. The data obtained by this technique are set forth for comparison to the gel technique in Table II.

TABLE II

| Polyol Type | Relative Reactivity | | |
|---|---|---|---|
| | Gel Time[1] (Sec) | Fourier Transform Method[2] | |
| | | 77° F. | 100° F. |
| B | 210 | 0.0016 | 0.0052 |
| C | 135 | 0.006 | N.D. |
| D | 170 | 0.004 | 0.0076 |
| E | 5 | 9.6 | 17. |
| F | 54 | 0.26 | 0.46 |
| G | 210 | 0.0016 | 0.004 |
| H | <.5 | N.D.* | N.D. |
| I | <0.5 | N.D. | N.D. |
| J | 24 | 0.82 | N.D. |
| K | 14 | N.D. | N.D. |
| L | 34 | 0.36 | N.D. |
| M | 32 | 0.48 | N.D. |
| N | 32 | 0.13 | 0.24 |
| O | 0.5 | N.D. | N.D. |
| P | 32 | N.D. | N.D. |
| Q | 27 | N.D. | N.D. |
| R | 150 | N.D. | N.D. |
| S | 150 | N.D. | N.D. |
| T | 138 | N.D. | N.D. |
| U | 156 | N.D. | N.D. |
| V | 31 | N.D. | N.D. |

*N.D. - Not determined.
[1]The larger the number, the slower the reactivity.
[2]The larger the number, the faster the reactivity.

EXAMPLES 2-14 and COMPARATIVE EXPERIMENTS A-E

Various examples and comparative experiments were conducted employing one of the following 3 procedures.

PROCEDURE A

The polyol components were degassed at room temperature under vacuum. The components were then added to a suitable mixing vessel in any order except that when a catalyst and/or an amine initiated or an amine containing an active hydrogen was employed, then they were added last. All of the components were added at room temperature. After hand mixing the components, the resultant mixture was poured into an 80° C.-100° C. preheated mold formed by placing 0.125 inch (0.32 cm) spacers between aluminum sheets such that the molded sheet produced therefrom was either 6"×12"×0.125" (15.24 cm×30.48 cm×0.32 cm) or 12"×18"×0.125" (30.48 cm×45.72 cm×0.32 cm). The mold cavity had been coated with a mold release agent. The thus formed sheets were then demolded within less than 5 minutes and post cured at 250° F. (121.11° C.) for 30 minutes prior to cutting the sheets into specimens for testing.

PROCEDURE B

This procedure employed a reaction injection molding machine with a high pressure impingement mixing head. Two streams were fed to the mixing head at controlled rates so as to provide the desired NCO:active hydrogen ratio. One stream contained the polyisocyanate preheated to a temperature between 70° F. (21.11° C.) and 110° F. (43.33° C.). The other stream contained all of the other components and was preheated to a temperature between 80° F. (26.67° C.) and 130° F. (54.44° C.). The resultant mixture was injected into a P-20 tool steel mold the lower half of which was 20"×12"×0.125" (50.8 cm×30.48 cm×0.32 cm), the upper half of which was 20"×12"×0.250" (50.8 cm×30.48 cm×0.64 cm) and a section at the top of which was 4"×8"×0.5" (10.16 cm×20.32 cm×1.27 cm). The mold was coated with a mold release agent and preheated to a temperature between 100° F. (37.78° C.) and 220° F. (104.44° C.). The molded sheet was removed from the mold within 5 minutes after mixing and was post cured at 250° F. (121.11° C.) for 60 min. prior to cutting into specimens for testing.

PROCEDURE C

The same procedure as B was employed with the following exceptions.
1. Fiberglass or mica fillers were employed and were included in both streams.
2. The fillers were dried at 250° F. overnight prior to mixing with the contents of the reservoirs for the two streams.
3. The molded article had an approximate thickness of 0.125 inches (0.32 cm).
4. The mold was steel and was preheated to a temperature between 125° F. (51.67° C.) and 165° F. (73.89° C.).

In these examples and comparative experiments, the properties were determined by the following methods.

NUMBER OF THERMAL TRANSITION TEMPERATURES

The thermal transition temperatures were obtained on a DuPont 990 thermal analyzer with a DuPont 943 thermomechanical analyzer (TMA) operated under a nitrogen atmosphere at a flow rate of 40 cc/min., a temperature scale of 20° C. per inch of chart, a program rate in the heating mode at 20° C. per minute at a shift setting of plus 5 inches.

The TMA axis was set at a scale of 0.5 inch per inch of chart employing the expansion mode set at zero load and the dY(10×) in [mils/min.] per inch set at 2. The number of thermal transition temperatures between −100° C. and 180° C. or the decomposition temperature of polyurethane, whichever occurred first is reported in the examples and comparative experiments.

FLEXURAL MODULUS

The flexural modulus values were determined by ASTM D-790-66 using $\frac{1}{2}"\times\frac{1}{8}"\times5"$ (1.27 cm×0.32 cm×12.7 cm) samples with a 2" (5.08 cm) span and a crosshead speed of 0.5 in/min. (1.27 cm/min.). The number presented is an average of 3 samples instead of 5 samples.

COEFFICIENT OF LINEAR EXPANSION

The coefficient of linear expansion was determined from the slope of the aforementioned TMA curve between the temperatures of −29° C. and 82° C.

The compositions and properties of various polyurethanes are given in the following Table III.

TABLE III

|  | Ex. 1 | Ex. 2 | Ex. 3 | Ex. 4 | Ex. 5 |
|---|---|---|---|---|---|
| FIRST POLYOL |  |  |  |  |  |
| Type/pbw[1] | B/50 | B/50 | B/50 | B/50 | B/50 |
| Equiv.[3] | 0.05 | 0.05 | 0.05 | 0.05 | 0.05 |
| Sol. Par | 9.0 | 9.0 | 9.0 | 9.0 | 9.0 |
| SECOND POLYOL |  |  |  |  |  |
| Type/pbw | E/69 | E/69 | E/69 | E/13.8 | E/69 |
| Equiv. | 1.0 | 1.0 | 1.0 | 0.2 | 1.0 |
| Sol. Par | 12.3 | 12.3 | 12.3 | 12.3 | 12.3 |
| THIRD POLYOL |  |  |  |  |  |
| Type/pbw | M/41.25 | M/41.25 | M/41.25 | M/15 | M/41.25 |
| Equiv. | 0.55 | 0.55 | 0.55 | 0.2 | 0.55 |
| Sol. Par | 12.81 | 12.81 | 12.81 | 12.81 | 12.81 |
| POLYISOCYANATE |  |  |  |  |  |
| Type/pbw | D/173 | D/196 | D/253 | D/67.6 | D/288 |
| NCO:Equiv./sol. par. | 1.20/15.08 | 1.36/15.08 | 1.76/15.08 | 0.47/15.08 | 2.0/15.08 |
| NCO:Active Hydrogen | 0.75:1 | 0.85:1 | 1.10:1 | 1.16:1 | 1.25:1 |
| CATALYST, Type/quant.[5] | None | None | None | None | None |
| FILLER, Type/quant.[4] | None | None | None | None | None |
| MODIFIER, Type/quant.[4] | None | None | None | None | None |

TABLE III-continued

|  |  |  |  |  |  |
|---|---|---|---|---|---|
| MIXING PROCEDURE | A | B | A | A | A |
| No. of Transition Temp. | 4 | 3 | 4 | 3 | 4 |
| Flexural Modulus[7] | | | | | |
| −20° F., psi (kg/cm$^2$) | 3.80 | 3.93(0.28) | 3.49 | 1.4(0.1) | 3.81 |
| 158° F., psi (kg/cm$^2$) | 1.52 | 2.43(0.17) | 2.07 | 0.61(0.043) | 1.93 |
| factor | 2.5 | 1.62 | 1.69 | 2.3 | 1.97 |
| Coefficient of Linear Expansion | | | | | |
| in/in/°F. × 10$^{-6}$ | N.D.[2] | 62.8 | N.D. | 62.5 | N.D. |
| (cm/cm/°C.) × 10$^{-6}$ | | (113.04) | | (112.5) | |

|  | Comp. Ex. A | Ex. 6 | Ex. 7[6] | Ex. 8 | Ex. 9 | Ex. 10[10] |
|---|---|---|---|---|---|---|
| FIRST POLYOL | | | | | | |
| Type/pbw[1] | B/50 | B/50 | B/50 | B/50 | B/50 | B/50 |
| Equiv.[3] | 0.05 | 0.05 | 0.05 | 0.05 | 0.05 | 0.05 |
| Sol. Par | 9.0 | 9.0 | 9.0 | 9.0 | 9.0 | 9.0 |
| SECOND POLYOL | | | | | | |
| Type/pbw | E/69 | E/69 | E/69 | E/69 | E/69 | E/69 |
| Equiv. | 1.0 | 1.0 | 1.0 | 1.0 | 1.0 | 1.0 |
| Sol. Par | 12.3 | 12.3 | 12.3 | 12.3 | 12.3 | 12.3 |
| THIRD POLYOL | | | | | | |
| Type/pbw | M/41.25 | M/41.25 | M/41.25 | M/41.25 | M/41.25 | M/41.25 |
| Equiv. | 0.55 | 0.55 | 0.55 | 0.55 | 0.55 | 0.55 |
| Sol. Par | 12.81 | 12.81 | 12.81 | 12.81 | 12.81 | 12.81 |
| POLYISOCYANATE | | | | | | |
| Type/pbw | D/345.6 | D/242 | D/242 | D/242 | D/242 | D/242 |
| NCO:Equiv./sol. par. | 2.4/15.08 | 1.68/15.08 | 1.68/15.08 | 1.68/15.08 | 1.68/15.08 | 1.68/15.08 |
| NCO:Active Hydrogen | 1.5:1 | 1.05:1 | 1.05:1 | 1.05:1 | 1.05:1 | 1.05:1 |
| CATALYST, Type/quant.[5] | None | A/0.2% | A/0.2% | None | None | None |
| FILLER, Type/quant.[4] | None | None | None | A/18% | C/25% | B,C/4%,25% |
| MODIFIER, Type/quant.[4] | None | None | None | None | None | None |
| MIXING PROCEDURE | B | C | C | C | C | C |
| No. of Transition Temp. | 2 | 3 | 3 | 3 | 3 | 3 |
| Flexural Modulus[7] | | | | | | |
| −20° F., psi (kg/cm$^2$) | 4.37(0.31) | 3.9(0.27) | 3.26(0.23) | 6.29(0.44) | 9.83(0.69) | 10.98(0.77) |
| 158° F., psi (kg/cm$^2$) | 1.19(0.084) | 2.01(0.14) | 1.58(0.11) | 4.21(0.3) | 7.45(0.52) | 7.85(0.55) |
| factor | 3.67 | 1.94 | 2.06 | 1.49 | 1.32 | 1.4 |
| Coefficient of Linear Expansion | | | | | | |
| in/in/°F. × 10$^{-6}$ | N.D. | 90.1 | 90.1 | 31.9 | 24.1 | 18.9 |
| (cm/cm/°C.) × 10$^{-6}$ | | (162.18) | (57.42) | (43.38) | (43.38) | (34.02) |

|  | Ex. 11 | Ex. 12 | Ex. 13 | Ex. 14 | Comp. Ex. B | Ex. 15 |
|---|---|---|---|---|---|---|
| FIRST POLYOL | | | | | | |
| Type/pbw[1] | B/25 | B/50 | B/50 | C/50 | C/50 | D/121.4 |
| Equiv.[3] | 24.53 | 0.05 | 0.05 | 0.05 | 0.05 | 0.05 |
| Sol. Par | 19.88/9.0 | 9.0 | 9.0 | 9.9 | 9.9 | 8.9 |
| SECOND POLYOL | | | | | | |
| Type/pbw | E/69 | E/103.5 | E/103.5 | E/27.6 | E/13.8 | E/69 |
| Equiv. | 1.0 | 1.5 | 1.5 | 0.4 | 0.2 | 1.0 |
| Sol. Par | 12.3 | 12.3 | 12.3 | 12.3 | 12.3 | 12.3 |
| THIRD POLYOL | | | | | | |
| Type/pbw | M/37.5 | L/29.15 | L/29.15 | J/15.2 | N/38.8 | M/37.5 |
| Equiv. | 0.5 | 0.55 | 0.55 | 0.4 | 0.4 | 0.5 |
| Sol. Par | 12.8 | 14.24 | 14.24 | 14.99 | 11.81 | 12.81 |
| POLYISOCYANATE | | | | | | |
| Type/pbw | C/216 | B/237 | C/298 | D/127.6 | D/97.6 | D/233 |
| NCO:Equiv./sol. par. | 1.6/15.08 | 1.68/10.9 | 2.2/15.08 | 0.89/15.08 | 0.68/15.08 | 1.62/15.08 |
| NCO:Active Hydrogen | 1.05:1 | 0.8:1 | 1.05:1 | 1.05:1 | 1.05:1 | 1.05:1 |
| CATALYST, Type/quant. | None | None | None | None | None | None |
| FILLER, Type/quant.[4] | None | None | None | None | None | None |
| MODIFIER, Type/quant.[4] | None | None | A/25% | None | None | None |
| MIXING PROCEDURE | B | B | B | A | A | A |
| No. of Transition Temp. | 4 | 3 | 3 | 2 | 2 | 3 |
| Flexural Modulus | | | | | | |
| −20°F., psi (kg/cm$^2$) | 3.77(0.27) | 5.77(0.41) | 6(0.42) | 4.4(0.31) | 2.4(0.17) | 1.7(0.12) |
| 158° F., psi (kg/cm$^2$) | 2.33(0.16) | 3.43(0.24) | 2.27(0.16) | 1.3(0.091) | 0.23(0.016) | 1.12(0.079) |
| factor | 1.62 | 1.68 | 2.64 | 3.39 | 10.44 | 1.52 |
| Coefficient of Linear Expansion | | | | | | |
| in/in/°F. × 10$^{-6}$ | 30.86 | 41.9 | 52.1 | 56.9 | N.D. | 50.5 |
| (cm/cm/°C.) × 10$^{-6}$ | (55.55) | (75.42) | (93.78) | (102.42) | | (90.9) |

|  | Ex. 16 | Ex. 17 | Ex. 18 | Comp. Ex. C | Comp. Ex. D | Ex. 19 |
|---|---|---|---|---|---|---|
| FIRST POLYOL | | | | | | |
| Type/pbw[1] | G/50 | G/50 | G/50 | C/50 | G/50 | F/26.6 |

TABLE III-continued

| MIXING PROCEDURE | A | A | A | A | B | B |
|---|---|---|---|---|---|---|
| No. of Transition Temp. | 3 | 4 | 3 | N.D. | 3 | N.D. |
| Flexural Modulus[7] | | | | | | |
| −20°F., psi (kg/cm$^2$) | 1.80 | 816.8[9] | 1.5 | 2.3 | 3.23 | 3.78 |
| 158° F., psi (kg/cm$^2$) | 1.04 | 647.3[9] | 1.2 | 0.9 | 0.3 | 2.22 |
| factor | 1.73 | 1.26 | 1.25 | 2.56 | 10.77 | 1.7 |
| Coefficient of Linear Expansion in/in/°F. × 10$^{-6}$ (cm/cm/°C.) × 10$^{-6}$ | N.D. | N.D. | N.D. | N.D. | N.D. | N.D. |

FOOTNOTES FOR TABLE III
[1]pbw - parts by weight
[2]N.D. = not determined
[3]The equivalents are the number of active hydrogen equivalents assuming the pbw values are grams and are for the purpose of calculating the NCO:active hydrogen equivalent ratio.
[4]Filler and modifier quantities are expressed as percent by weight of total polymer weight plus filler or modifier weight.
[5]Quantity of catalyst is based upon the combined weight of the three polyols.
[6]This example employed 5.5% by weight of trichlorofluoromethane based on the combined weight of the three polyols as a blowing agent and 1.25% by weight of DC-193 based on the combined weight of the three polyols as a silcone cell control agent.
[7]Psi and kg/cm$^2$ values are × 10$^5$.
[8]This example employed 47.01% by weight of trichlorofluoromethane based on the combined weight of the three polyols as a blowing agent and 2.74% by weight of DC-193 based on the combined weight of the polyols as a silicone cell control agent.
[9]Actual value; therefore number is not × 10$^5$.
[10]This example employed 2.5% by weight of trichlorofluoromethane based on the combined weight of the three polyols as a blowing agent and 0.25% by weight of DC-193 based on the combined weight of the polyols as a silicone cell control agent.
[11]N.C. = Not calculated (insufficient data available to calculate).

EXAMPLE 31

The polymer of Example 28 was examined by thermomechanical analysis as described previously and gave three thermal transition temperatures at about −68° C., 64° C. and 110° C.

The polymer of Example 28 was also examined by differential scanning calorimetry using a Mettler TA 2000 system under the following condition:

| sample weight | 16.3 mg. |
|---|---|
| reference | Al$_2$O$_3$, 20 mg. |
| atmosphere | N$_2$ at 20 ml/min. |
| scan speed | 10° C./min. |
| amplifier range | 100 m volts/fsd |

The following endotherm temperatures were observed: about −55° C., 95° C., 133° C. and 230° C.

EXAMPLE 32

The method of the preceding examples was employed using procedure A with the following components as results.

25 grams (0.025 equiv.) Polyol B
69 grams (1.0 equiv.) Polyol E
37.5 grams (0.5 equiv.) Polyol M
232 grams (1.76 equiv.) Polyisocyanate G
The NCO:OH ratio was 1.14:1.
Flexural Modulus
 −20° F., psi (kg/cm$^2$)=407,000 (28,612.1)
 158° F., psi (kg/cm$^2$)=185,000 (13,005.5)
 factor=2.20

The flexural modulus data was determined on samples measuring 1"×⅛"×5" (2.54 cm×0.32 cm×12.7 cm).

The number of thermal transitions was 3.

EXAMPLE 33

The method of the preceding examples was employed using procedure A with the following components and results.

121.4 grams (0.05 equiv.) of Polyol D
69 grams (1.0 equiv.) of Polyol E
48.5 grams (0.5 equiv.) of Polyol N
232 grams (1.76 equiv.) of Polyisocyanate G
The NCO:OH ratio was 1.14:1.
Flexural Modulus
 −20° F., psi (kg/cm$^2$)=141,000 (9,912.3)
 158° F., psi (kg/cm$^2$)=58,000 (4,077.4)
 factor=2.43

The flexural modulus values were determined on samples measuring 1"×⅛"×5" (2.54 cm×0.32 cm×12.7 cm).

The number of thermal transitions was 3.

EXAMPLES 34-38

A series of experiments were performed according to procedure A as previously described varying the NCO:active hydrogen equivalent ratio. The components and results are given in the following Table IV.

TABLE IV

| | Ex. 34 | Ex. 35 | Ex. 36 | Ex. 37 | Ex. 38 |
|---|---|---|---|---|---|
| FIRST POLYOL | | | | | |
| Type/pbw[1] | B/50 | B/50 | B/50 | B/50 | B/50 |
| Equiv.[2] | 0.05 | 0.05 | 0.05 | 0.05 | 0.05 |
| Sol. Par | 9.0 | 9.0 | 9.0 | 9.0 | 9.0 |
| SECOND POLYOL | | | | | |
| Type/pbw | E/69 | E/69 | E/69 | E/69 | E/69 |
| Equiv. | 1.0 | 1.0 | 1.0 | 1.0 | 1.0 |
| Sol. Par | 12.3 | 12.3 | 12.3 | 12.3 | 12.3 |
| THIRD POLYOL | | | | | |
| Type/pbw | M/41.25 | M/41.25 | M/41.25 | M/41.25 | M/41.25 |
| Equiv. | 0.55 | 0.55 | 0.55 | 0.55 | 0.55 |
| Sol. Par | 12.81 | 12.81 | 12.81 | 12.81 | 12.81 |
| POLYISOCYANATE | | | | | |
| Type/pbw | D/299.1 | D/310.6 | D/322.1 | D/333.6 | D/345.2 |

TABLE III-continued

|  | | | | | | |
|---|---|---|---|---|---|---|
| Equiv.[3] | 0.05 | 0.05 | 0.05 | 0.05/49.07 | 0.05/49.9 | 0.31/24.3 |
| Sol. Par | 7.8 | 7.8 | 7.8 | 9.9 | 7.8 | 8.9 |
| SECOND POLYOL | | | | | | |
| Type/pbw | E/34.5 | L/29.15 | L/29.15 | E/14 | P/40 | P/79.5 |
| Equiv. | 0.5 | 0.55 | 0.55 | 0.2 | 0.25 | 0.5 |
| Sol. Par. | 12.3 | 14.24 | 14.24 | 12.3 | N.C.[11] | N.C.[11] |
| THIRD POLYOL | | | | | | |
| Type/pbw | L/29.15 | F/26.6 | F/88.7 | M/15 | L/26.5 | L/26.5 |
| Equiv. | 0.55 | 0.31 | 1.03 | 0.2 | 0.5 | 0.5 |
| Sol. Par | 14.24 | 8.9 | 8.9 | 12.81 | 14.24 | 14.24 |
| POLYISOCYANATE | | | | | | |
| Type/pbw | D/165 | D/135 | D/240 | E/52.5 | D/121 | D/197 |
| NCO:Equiv./sol. par. | 1.15/15.08 | 0.94/15.08 | 1.67/15.08 | 0.471 | 0.84/15.08 | 1.37/15.08 |
| NCO:Active Hydrogen | 1.05:1 | 1.03:1 | 1.02:1 | 1.04:1 | 1.05:1 | 1.05:1 |
| CATALYST, Type/quant. | None | D/0.5% | D/0.5% | None | D/0.5% | D/0.5% |
| FILLER, Type/quant.[4] | None | None | None | None | None | None |
| MODIFIER, Type/quant.[4] | None | None | None | None | None | None |
| MIXING PROCEDURE | A | A | A | A | A | A |
| No. of Transition Temp. | 3 | 3 | 3 | N.D. | 4 | 2 |
| Flexural Modulus[7] | | | | | | |
| −20° F., psi (kg/cm$^2$) | 4.14(0.29) | 3.3(0.23) | 4.1(0.29) | 1.78(0.13) | 4.14 | 4.35 |
| 158° F., psi (kg/cm$^2$) | 2.62(0.18) | 1.2(0.084) | 1.6(0.11) | 0.08(0.0006) | 0.66 | 2.62 |
| factor | 1.58 | 2.75 | 2.56 | 22.25 | 6.27 | 1.66 |
| Coefficient of Linear Expansion | | | | | | |
| in/in/°F. × 10$^{-6}$ | N.D. | 60.5 | 47.9 | 49.3 | N.D. | N.D. |
| (cm/cm/°C.) × 10$^{-6}$ | | (108.9) | (86.22) | (88.74) | | |

|  | Ex. 20 | Ex. 21 | Ex. 22 | Ex. 23 | Ex. 24 | Ex. 25 |
|---|---|---|---|---|---|---|
| FIRST POLYOL | | | | | | |
| Type/pbw[1] | G/50 | L/13.25 | L/29.15 | L/29.15 | S/121.5 | T/125 |
| Equiv.[3] | 0.05 | 0.25 | 0.55 | 0.55 | 0.05 | 0.05 |
| Sol. Par. | 7.8 | 14.24 | 14.24 | 14.24 | 7.93 | 7.9 |
| SECOND POLYOL | | | | | | |
| Type/pbw | Q/40 | E/26.6 | O/25 | O/25 | E/69 | E/69 |
| Equiv. | 0.2 | 0.39 | 0.05 | 0.05 | 1.0 | 1.0 |
| Sol. Par | 8.39 | 12.3 | 8.25 | 8.25 | 12.3 | 12.3 |
| THIRD POLYOL | | | | | | |
| Type/pbw | L/29.15 | Q/40 | E/17.25 | E/86.25 | N/53.4 | N/53.4 |
| Equiv. | .55 | 0.2 | 0.25 | 1.25 | 0.55 | 0.55 |
| Sol. Par | 14.24 | 8.39 | 12.3 | 12.3 | 11.81 | 11.81 |
| POLYISOCYANATE | | | | | | |
| Type/pbw | D/121 | D/113.4 | D/128.5 | D/278 | D/243 | D/243 |
| NCO:Equiv./sol. par. | 0.84/15.08 | 0.79/15.08 | 0.89/15.08 | 1.93/15.08 | 1.69/15.08 | 1.69/15.08 |
| NCO:Active Hydrogen | 1.05:1 | 0.94:1 | 1.05:1 | 1.04:1 | 1.05:1 | 1.05:1 |
| CATALYST, Type/quant. | D/0.5% | None | None | None | None | None |
| FILLER, Type/quant.[4] | None | None | None | None | None | None |
| MODIFIER, Type/quant.[4] | None | None | None | None | None | None |
| MIXING PROCEDURE | A | A | A | A | A | A |
| No. of Transition Temp. | 4 | 2 | 3 | 3 | 4 | 3 |
| Flexural Modulus[7] | | | | | | |
| −20° F., psi (kg/cm$^2$) | 2.78 | 4.55 | 2.50 | 4.24 | 2.53 | 2.47 |
| 158° F., psi (kg/cm$^2$) | 0.91 | 2.79 | 1.28 | 2.55 | 1.38 | 1.38 |
| factor | 3.06 | 1.63 | 1.95 | 1.66 | 1.83 | 1.79 |
| Coefficient of Linear Expansion | | | | | | |
| in/in/°F. × 10$^{-6}$ | | | | | | |
| (cm/cm/° C.) × 10$^{-6}$ | N.D. | N.D. | N.D. | N.D. | N.D. | N.D. |

|  | Ex. 26 | Ex. 27[8] | Ex. 28 | Ex. 29 | Comp. Ex. E | Ex. 30 |
|---|---|---|---|---|---|---|
| FIRST POLYOL | | | | | | |
| Type/pbw[1] | U/149 | B/7.64 | D/121.4 | G/50 | B/50 | B/19 |
| Equiv.[3] | 0.05 | 0.01 | 0.05 | 0.05 | 0.05 | 0.02 |
| Sol. Par. | 8.5 | 9.0 | 8.9 | 7.8 | 9.0 | 9.0 |
| SECOND POLYOL | | | | | | |
| Type/pbw | E/104 | E/20.9 | E/69 | L/29.15 | K/36.85 | E/52.5 |
| Equiv. | 1.51 | 0.3 | 1 | 0.55 | 0.55 | 0.76 |
| Sol. par | 12.3 | 12.3 | 12.3 | 14.24 | 11.53 | 12.3 |
| THIRD POLYOL | | | | | | |
| Type/pbw | M/41.25 | M/11.66 | N/48.5 | F/26.6 | V/112 | M/28.5 |
| Equiv. | 0.55 | 0.16 | 0.5 | 0.31 | 1.0 | 0.38 |
| Sol. Par. | 12.81 | 12.81 | 11.81 | 8.9 | 9.4 | 12.81 |
| POLYISOCYANATE | | | | | | |
| Type/pbw | D/318 | C/65 | D/243 | F/133.3 | D/243 | F/171.2 |
| NCO:Equiv./sol. par. | 2.21/15.08 | 0.48/15.8 | 1.69/15.08 | 0.95/15.2 | 1.69/15.08 | 1.22/15.2 |
| NCO:Active Hydrogen | 1.05:1 | 1.02:1 | 1.09:1 | 1.04:1 | 1.06:1 | 1.05:1 |
| CATALYST, Type/quant. | None | None | None | D/0.05% | D/0.05% | None |
| FILLER, Type/quant.[4] | None | None | None | None | None | None |
| MODIFIER, Type/quant.[4] | None | None | None | None | None | None |

TABLE IV-continued

|  | Ex. 34 | Ex. 35 | Ex. 36 | Ex. 37 | Ex. 38 |
|---|---|---|---|---|---|
| NCO:Equiv./sol. par. | 2.08/15.08 | 2.16/15.08 | 2.24/15.08 | 2.32/15.08 | 2.40/15.08 |
| NCO:Active Hydrogen | 1.30:1 | 1.35:1 | 1.40:1 | 1.45:1 | 1.50:1 |
| MIXING PROCEDURE | A | A | A | A | A |
| No. of Transition Temp. | N.A.[4] | N.A. | N.A. | N.A. | 3 |
| Flexural Modulus[3] | | | | | |
| −20° F., psi (kg/cm$^2$) | 3.10 (0.22) | 3.22 (0.23) | 3.51 (0.25) | 3.22 (0.23) | 3.39 (0.24) |
| 158° F., psi (kg/cm$^2$) | 2.37 (0.17) | 2.25 (0.16) | 2.55 (0.18) | 2.51 (0.18) | 2.33 (0.16) |
| factor | 1.31 | 1.43 | 1.38 | 1.28 | 1.45 |

FOOTNOTES FOR TABLE IV
[1] pbw - parts by weight
[2] The equivalents are the number of active hydrogen equivalents assuming the pbw values are grams and are for the purpose of calculating the NCO:active hydrogen equivalent ratio.
[3] Psi and kg/cm$^2$ values are × 10$^5$ and the test specimens were 1″ × ⅛″ × 5″ (2.54 cm × 0.32 cm × 12.7 cm).
[4] N.A. = Value was not available at the date of mailing the application.

We claim:

1. A polyurethane having a flexural modulus factor (−20° F./158° F.) of not greater than about 3.4 and at least three thermal transition temperatures measured between −100° C. and the decomposition temperature of the polyurethane as determined by thermomechanical analysis.

2. The polyurethane of claim 1 wherein the flexural modulus factor (−20° F./158° F.) is less than about 3.

3. The polyurethane of claim 1 wherein the flexural modulus factor (−20° F./158° F.) is less than about 2.75.

4. The polyurethane of claim 1 wherein the flexural modulus factor (−20° F./158° F.) is less than about 2.0.

5. A polyurethane composition having a flexural modulus factor (−20° F./158° F.) of not greater than 3.4 and at least two thermal transition temperatures between −100° C. and the decomposition temperature of the polyurethane as determined by thermomechanical analysis, said composition resulting from admixing and reacting the components of a composition comprising at least three different polyols having different relative reactivities at the temperature of reaction and an organic compound having a plurality of NCO and/or NCS groups wherein each of said polyols have a solubility parameter different from each other by a value greater than 0.49 when said polyols are present in quantities such that the number of active hydrogen equivalents contributed by the second most reactive polyol is greater than that contributed by the most reactive polyol, said solubility parameters being determined by the method of Small and wherein the NCO and/or NCS:active hydrogen equivalent ratio is from about 0.75:1 to about 1.5:1.

6. A polyurethane composition having a flexural modulus factor (−20° F./158° F.) of not greater than 3.4 and at least two thermal transition temperatures between −100° C. and the decomposition temperature of the polyurethane as determined by thermomechanical analysis, said composition resulting from admixing and reacting the components of a composition comprising:

(A) a first polyol or mixture of polyols having a plurality of hydrogen atoms reactive with an NCO and/or an NCS group, an average active hydrogen equivalent weight of from about 50 to about 4000 and an average active hydrogen functionality of from about 2 to about 8;

(B) a second polyol or mixture of polyols having a plurality of hydrogen atoms reactive with an NCO and/or an NCS group, an average active hydrogen equivalent weight of from about 50 to about 4000 and an active hydrogen functionality of from about 2 to about 8;

(C) a third polyol or mixture of polyols having a plurality of hydrogen atoms reactive with an NCO and/or an NCS group, an active hydrogen equivalent weight of from about 20 to about 4000 and an average active hydrogen functionality of from about 2 to about 6; and (D) an organic compound having a plurality of NCO and/or NCS groups or mixture of such compounds; wherein (1) at least two of the polyol components (A), (B) and (C) have different relative reactivities, at the temperature of reaction, with component (D) and the relative reactivity of polyol component (B) being equal to or greater than that of polyol components (A) and (C);

(2) the solubility parameter of each of the polyols in polyol components (A), (B) and (C) is different from each other by a value greater than 0.49 when the number of active hydrogen equivalents contributed by polyol component (C) is greater than the number of active hydrogen equivalents contributed by polyol component (B) said solubility parameters being determined by the method of Small;

(3) the NCO and/or NCS:active hydrogen equivalent ratio is from about 0.75:1 to about 1.5:1.

7. The polyurethane composition of claim 6 wherein:

(1) said first polyol component has an active hydrogen equivalent weight of from about 70 to about 3000 and a functionality of from about 2 to about 4;

(2) said second polyol component has an active hydrogen equivalent weight of from about 65 to about 1000 and a functionality of from about 3 to about 4;

(3) said third polyol component has an active hydrogen equivalent weight of from about 30 to about 120 and a functionality of from about 2 to about 4;

(4) the NCO and/or NCS:active hydrogen ratio is from about 0.75:1 to about 1.25:1 and (5) the relative reactivities for all three of said first, second or third polyol or mixture of polyols are different; and (6) component (D) is an aromatic compound.

8. The polyurethane composition of claim 7 wherein:

(1) said first polyol component has an active hydrogen equivalent weight of from about 85 to about 2500;

(2) said second polyol component has an active hydrogen equivalent weight of from about 65 to about 500;

(3) said third polyol component has an active hydrogen equivalent weight of from about 50 to about 100 and a functionality of from about 2 to about 3;

(4) the NCO and/or NCS:active hydrogen equivalent ratio is from about 0.95:1 to about 1.25:1; and (5) the relative reactivities for all three of said first, second or third polyol components are in the order of second > third > first.

9. The polyurethane of claim 8 wherein the solubility parameter of said first, second and third polyol components differ from each other by a value of at least 1, and the NCO and/or NCS:active hydrogen equivalent ratio is from about 1.01:1 to about 1.10:1.

10. The polyurethane of claim 9 wherein (1) each of said first, second and third polyol components contain only active hydrogens derived from —OH, —NH, or NH$_2$ groups; and (2) component (D) is a compound or mixture of compounds having only a plurality of NCO groups.

11. The polyurethane of claim 10 wherein each of said first, second and third polyol components contain only active hydrogens derived from OH groups.

12. The polyurethane of claims 6, 7, 8, 9, 10 or 11 wherein the flexural modulus factor (−20° F./158° F.) is less than about 3.

13. The polyurethane of claims 6, 7, 8, 9, 10 or 11 wherein the flexural modulus factor (−20° F./158° F.) is less than about 2.75.

14. The polyurethane of claims 6, 7, 8, 9, 10 or 11 wherein the flexural modulus factor (−20° F./158° F.) is less than about 2.0.

15. The polyurethane of claim 12 containing at least three thermal transition temperatures.

16. The polyurethane of claim 13 containing at least three thermal transition temperatures.

17. The polyurethane of claim 14 containing at least three thermal transition temperatures.

18. A polyol mixture suitable for reacting with an organic compound containing a plurality of NCO and/or NCS groups or mixture of such compounds so as to form a polyurethane having at least two thermal transition temperatures, as determined by thermomechanical analysis, between −100° C. and the decomposition temperature of the polyurethane and a flexural modulus factor (−20° F./158° F.) of not greater than 3.4; said polyol mixture comprising:

(A) a first polyol or mixture of polyols having a plurality of hydrogen atoms reactive with an NCO and/or an NCS group, an average active hydrogen equivalent weight of from about 50 to about 4000 and an average active hydrogen functionality of from about 2 to about 8;

(B) a second polyol or mixture of polyols having a plurality of hydrogen atoms reactive with an NCO and/or an NCS group, an average active hydrogen equivalent weight of from about 50 to about 4000 and an active hydrogen functionality of from about 2 to about 8;

(C) a third polyol or mixture of polyols having a plurality of hydrogen atoms reactive with an NCO and/or an NCS group, an active hydrogen equivalent weight of from about 20 to about 4000 and an average active hydrogen functionality of from about 2 to about 6;

(1) at least two of the polyol components (A), (B) and (C) have different relative reactivities, at the temperature of reaction, with component (D) and the relative reactivity of polyol component (B) being equal to or greater than that of polyol components (A) and (C);

(2) the solubility parameter of each of the polyols in polyol components (A), (B) and (C) is different from each other by a value greater than 0.49 when the number of active hydrogen equivalents contributed by polyol component (C) is greater than the number of active hydrogen equivalents contributed by polyol component (B) said solubility parameters being determined by the method of Small.

19. The polyol mixture of claim 18 wherein:

(1) said first polyol component has an active hydrogen equivalent weight of from about 70 to about 3000 and a functionality of from about 2 to about 4;

(2) said second polyol component has an active hydrogen equivalent weight of from about 65 to about 1000 and a functionality of from about 3 to about 4;

(3) said third polyol component has an active hydrogen equivalent weight of from about 30 to about 120 and a functionality of from about 2 to about 4; and (4) the relative reactivities for all three of said first, second and third polyol components are different.

20. The polyol mixture of claim 19 wherein:

(1) said first polyol component has an active hydrogen equivalent weight of from about 85 to about 2500;

(2) said second polyol component has an active hydrogen equivalent weight of from about 65 to about 500;

(3) said third polyol component has an active hydrogen equivalent weight of from about 50 to about 100 and a functionality of from about 2 to about 3; and (4) the relative reactivities for said first, second and third polyol components are in the order of second > third > first.

21. The polyol mixture of claim 20 wherein the solubility parameter of said first, second and third polyol components differ from each other by a value of at least 1.

22. The polyol mixture of claim 21 wherein each of said first, second and third polyol components contain only active hydrogens derived from —OH,

—NH,
| or —NH$_2$ groups.

23. The polyol mixture of claim 22 wherein each of said first, second and third polyol components contain active hydrogens derived only from OH groups.

24. A process for the preparation of a polyurethane having a flexural modulus factor (−20° F./158° F.) of not greater than 3.4 and at least two thermal transition temperatures, as determined by thermomechanical analysis, between −100° C. and the decomposition temperature of the polyurethane, which process comprises admixing and reacting the components of a composition comprising:

(A) a first polyol or mixture of polyols having a plurality of hydrogen atoms reactive with an NCO and/or an NCS group, an average active hydrogen equivalent weight of from about 50 to about 4000 and an average active hydrogen functionality of from about 2 to about 8;

(B) a second polyol or mixture of polyols having a plurality of hydrogen atoms reactive with an NCO and/or an NCS group, an average active hydrogen equivalent weight of from about 50 to about 4000 and an active hydrogen functionality of from about 2 to about 8;

(C) a third polyol or mixture of polyols having a plurality of hydrogen atoms reactive with an NCO and/or an NCS group, an active hydrogen equivalent weight of from about 20 to about 4000 and an average active hydrogen functionality of from about 2 to about 6; and (D) an organic compound having a plurality of NCO and/or NCS groups or mixture of such compounds; wherein (1) at least two of the polyol components (A), (B) and (C) have different relative reactivities, at the temperature of reaction, with component (D) and the relative reactivity of polyol component (B) being equal to or greater than that of polyol components (A) and (C);

(2) the solubility parameter of each of the polyols in polyol components (A), (B) and (C) is different from each other by a value greater than 0.49 when the number of active hydrogen equivalents contributed by polyol component (C) is greater than the number of active hydrogen equivalents contributed by polyol component (B), said solubility parameters being determined by the method of Small;

(3) the NCO and/or NCS:active hydrogen equivalent ratio is from about 0.75:1 to about 1.5:1.

25. The process of claim 24 wherein:

(1) said first polyol component has an active hydrogen equivalent weight of from about 70 to about 3000 and a functionality of from about 1 to about 4;

(2) said second polyol component has an active hydrogen equivalent weight of from about 65 to about 1000 and a functionality of from about 3 to about 4;

(3) said third polyol component has an active hydrogen equivalent weight of from about 30 to about 120 and a functionality of from about 2 to about 4;

(4) the NCO and/or NCS:active hydrogen ratio is from about 0.75:1 to about 1.25:1; and (5) the relative reactivities for all three of said first, second or third polyol components are different, and (6) component (D) is an aromatic compound.

26. The process of claim 25 wherein:

(1) said first polyol component has an active hydrogen equivalent weight of from about 85 to about 2500;

(2) said second polyol component has an active hydrogen equivalent weight of from about 65 to about 500;

(3) said third polyol component has an active hydrogen equivalent weight of from about 50 to about 100 and a functionality of from about 2 to about 3;

(4) the NCO and/or NCS:active hydrogen equivalent ratio is from about 0.95:1 to about 1.25:1; and (5) the relative reactivities for said first, second or third polyol components are in the order of second > third > first.

27. The process of claim 26 wherein (1) the solubility parameter of said first, second and third polyol components differ from each other by a value of at least 1, and (2) the NCO and/or NCS:active hydrogen equivalent ratio is from about 1.01:1 to about 1.10:1.

28. The process of claim 27 wherein (1) each of said first, second and third polyol components contain only active hydrogens derived from —OH,

—NH,
| or —NH$_2$ groups; and (2) component (D) is a compound or mixture of compounds having only a plurality of NCO groups.

29. The process of claim 28 wherein each of said first, second and third polyol components contain only active hydrogens derived from OH groups.

30. The process of claims 24, 25, 26, 27, 28 or 29 wherein the resultant polyurethane has a flexural modulus factor (−20° F./158° F.) of less than about 3.

31. The process of claims 24, 25, 26, 27, 28 or 29 wherein the resultant polyurethane has a flexural modulus factor (−20° F./158° F.) of less than about 2.75.

32. The process of claims 24, 25, 26, 27, 28 or 29 wherein the resultant polyurethane has a flexural modulus factor (−20° F./158° F.) of less than about 2.0.

33. The process of claim 30 wherein the resultant polyurethane contains at least three thermal transition temperatures.

34. The process of claim 31 wherein the resultant polyurethane contains at least three thermal transition temperatures.

35. The process of claim 32 wherein the resultant polyurethane contains at least three thermal transition temperatures.

36. The composition of claim 5 wherein the flexural modulus factor (−20° F./158° F.) is less than about 3 and the organic compound is an aromatic polyisocyanate.

37. The composition of claim 5 wherein the flexural modulus factor (−20° F./158° F.) is less than about 2.75 and the organic compound is an aromatic polyisocyanate.

38. The composition of claim 5 wherein the flexural modulus factor (−20° F./158° F.) is less than about 2.0 and the organic compound is an aromatic polyisocyanate.

39. The composition of claims 5, 36, 37 or 38 wherein the solubility parameter of each of the polyols is different by a value of at least 1 regardless of the number of active hydrogen equivalents contributed by each polyol.

* * * * *

UNITED STATES PATENT AND TRADEMARK OFFICE
CERTIFICATE OF CORRECTION

PATENT NO. : 4,246,363
DATED : January 20, 1981
INVENTOR(S) : Robert B. Turner and Roy E. Morgan, Jr.

It is certified that error appears in the above-identified patent and that said Letters Patent are hereby corrected as shown below:

Column 7, line 51; change "an" to --and--.

Column 8, line 38; insert --DC-195-- between "DC-193," and "DC-197".

Column 9, line 7; change "sutable" to --suitable--.

Column 10, line 62; change "Fiberlgass" to --Fiberglass--.

Column 11, line 21, in Table I, second heading; capitalize --Molecular--.

Column 12, line 28; delete the second occurrence of "to".

Column 12, line 3; change "spectrophtometer" to --spectrophotometer--.

Signed and Sealed this

Twenty-sixth Day of May 1981

[SEAL]

*Attest:*

RENE D. TEGTMEYER

*Attesting Officer*   *Acting Commissioner of Patents and Trademarks*